United States Patent
Down et al.

(10) Patent No.: US 7,617,582 B2
(45) Date of Patent: Nov. 17, 2009

(54) METHOD OF MANUFACTURING COMPOSITE GENERATOR ROTOR SHAFT

(75) Inventors: Edward M. Down, Tucson, AZ (US); David E. Stout, Tucson, AZ (US); David R. Minke, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 905 days.

(21) Appl. No.: 11/175,807

(22) Filed: Jul. 5, 2005

(65) Prior Publication Data

US 2007/0006445 A1   Jan. 11, 2007

(51) Int. Cl.
B23P 11/02   (2006.01)
H02K 15/14   (2006.01)

(52) U.S. Cl. .......................................... 29/447; 29/596
(58) Field of Classification Search ............... 29/447, 29/596, 508; 310/263; 138/130; 464/179, 464/182
See application file for complete search history.

(56) References Cited

U.S. PATENT DOCUMENTS

| | | | |
|---|---|---|---|
| 3,862,489 A | 1/1975 | Weisinger | |
| 3,938,964 A | 2/1976 | Schmidt | |
| 4,318,280 A | 3/1982 | Williams | |
| 4,514,470 A | 4/1985 | Rosenthal et al. | |
| 4,685,236 A * | 8/1987 | May | 42/76.02 |
| 4,834,693 A | 5/1989 | Profant et al. | |
| 5,079,099 A | 1/1992 | Prewo et al. | |
| 5,108,025 A | 4/1992 | Kang et al. | |
| 5,277,661 A | 1/1994 | Mak et al. | |
| 5,553,964 A | 9/1996 | Rouillot | |
| 5,618,635 A | 4/1997 | Newkirk et al. | |
| 6,072,252 A | 6/2000 | Van Dine et al. | |
| 6,210,283 B1 | 4/2001 | Wojciechowski et al. | |
| 6,218,026 B1 | 4/2001 | Ewing et al. | |
| 6,234,912 B1 | 5/2001 | Koschier et al. | |
| 6,336,986 B1 | 1/2002 | Lee et al. | |
| 6,409,606 B1 | 6/2002 | Nakajima et al. | |
| 6,715,993 B2 | 4/2004 | Wojciechowski et al. | |
| 2004/0082394 A1 | 4/2004 | Lee et al. | |
| 2004/0141837 A1 | 7/2004 | McMillan et al. | |
| 2006/0127693 A1 * | 6/2006 | Peslerbe et al. | 428/650 |

* cited by examiner

*Primary Examiner*—John C Hong
(74) *Attorney, Agent, or Firm*—Oral Caglar, Esq.

(57) ABSTRACT

A method for manufacturing a rotor shaft is provided. A rod is formed from a metal matrix composite material, the rod having an outer diameter. The rod is heated to attain a stiffness thereof that is greater than about 300 GPa. A machinable sleeve is formed from material having a stiffness that is less than the stiffness of the rod and that is different than the material of the rod, the sleeve having an inner diameter that is equal to or less than the rod outer diameter. The rod is inserted into the sleeve, after the rod is heated.

9 Claims, 3 Drawing Sheets

METHOD OF MANUFACTURING COMPOSITE GENERATOR ROTOR SHAFT

TECHNICAL FIELD

The present invention relates to rotating machines and, more particularly, to a shaft for use in a high speed electrical generator.

BACKGROUND

Generator systems for aircraft may include three separate brushless generators, namely, a permanent magnet generator (PMG), an exciter, and a main generator. Each generator includes rotors mounted on a common rotatable shaft. The PMG includes permanent magnets on its rotor. When the PMG rotates, AC currents are induced in stator windings of the PMG. These AC currents are fed to a regulator or a control device, which in turn outputs a DC current. Next, the DC current is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator windings, and this three-phase AC output can then be provided to a load such as, for example, an aircraft electrical system.

In recent years, the demand for lower weight, higher power generators capable of rotating in a speed range of 12,000 rpm to 24,000 rpm has increased. To meet these demands, generators now incorporate rotors having larger diameters than previously used rotors. However, a larger rotor may cause the generator to reach its lowest speed resonance value while rotating at a speed lower than desired, for example, at speeds of less than 12,000 rpm. To counteract this phenomenon, the rotor may be mounted to a stiffer, lighter shaft, which can shift the lowest speed resonance to a higher value to allow the rotor to rotate at a higher speed.

Current shafts, however, are not suitable for incorporation into high power generators. In particular, the shafts typically have thin walls and do not have a stiffness that is sufficient to shift the lowest speed resonance of a rotor to a desired value. Additionally, the cost associated with manufacturing these shafts is relatively high. Consequently, implementing these shafts into a generator may not be economically feasible.

Therefore, there is a need for a shaft that is suitable for incorporation into high power generators. Additionally, there is a need for a shaft that is sufficiently stiff and light to shift the lowest speed resonance of a generator to a desired value. Moreover, a relatively inexpensive method for manufacturing the shaft is needed. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides methods for manufacturing a rotor shaft. In one exemplary embodiment, a rod is formed from a metal matrix composite material, the rod having an outer diameter. The rod is manufactured and heat treated to attain a stiffness thereof that is greater than about 300 GPa. A machineable sleeve is formed from material having a stiffness that is less than the stiffness of the rod and that is different than the material of the rod, the sleeve having an inner diameter that is equal to or less than the rod outer diameter. The rod is inserted into the sleeve, after the rod and sleeve have been formed and heat treated to optimize their mechanical properties.

In another exemplary embodiment, a rod is formed from a metal matrix composite material, the rod having a stiffness greater than about 300 GPa, and a material is deposited over the rod to form a sleeve of more easily machineable material, having a stiffness that is less than the stiffness of the rod and that is different than the material of the rod.

In still another embodiment, a rod is formed from a metal matrix composite material comprising a steel alloy having discontinuous random silicon carbide fibers dispersed therethrough, and the rod has an outer diameter. The rod is heated to attain a stiffness thereof that is greater than about 200 GPa. A machinable sleeve is formed from material having a stiffness that is less than the stiffness of the rod and that is different than the material of the rod, and the sleeve has an inner diameter that is equal to or less than the rod outer diameter. The sleeve is heated and the rod is cooled. Then, the rod is inserted into the sleeve, after the sleeve is heated to attain the predetermined material mechanical properties.

Other independent features and advantages of the preferred rotor will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present embodiment is, for convenience of explanation, depicted and described as being implemented in a brushless AC (alternating current) generator, it will be appreciated that it can be implemented in other electric machines needed in specific applications.

Figure 1:
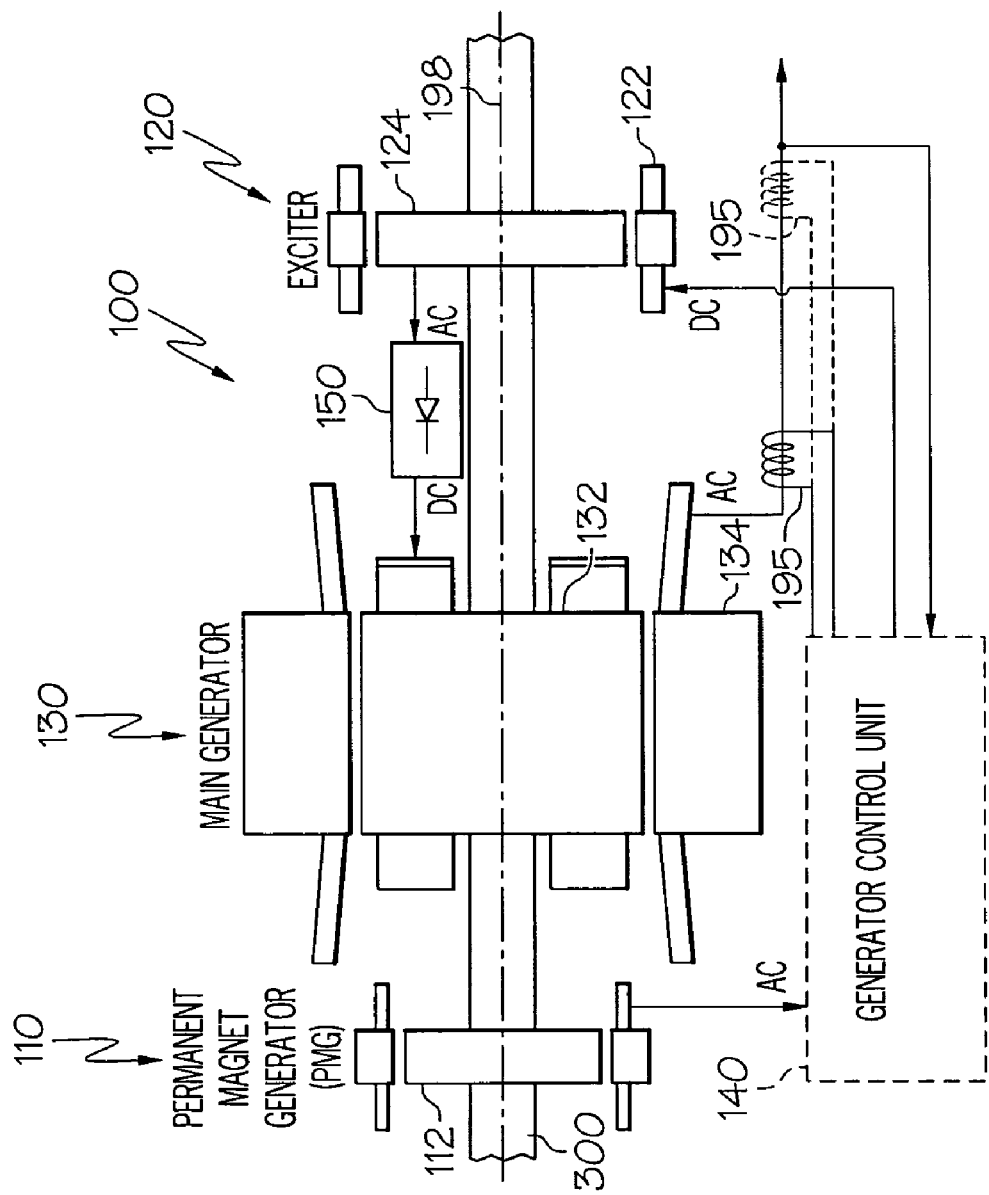
FIG. 1 is a functional schematic block diagram of an exemplary generator system.

Turning now to the description, and with reference first to FIG. 1, a functional schematic block diagram of an exemplary generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150.

During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies AC power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195.

Figure 2:
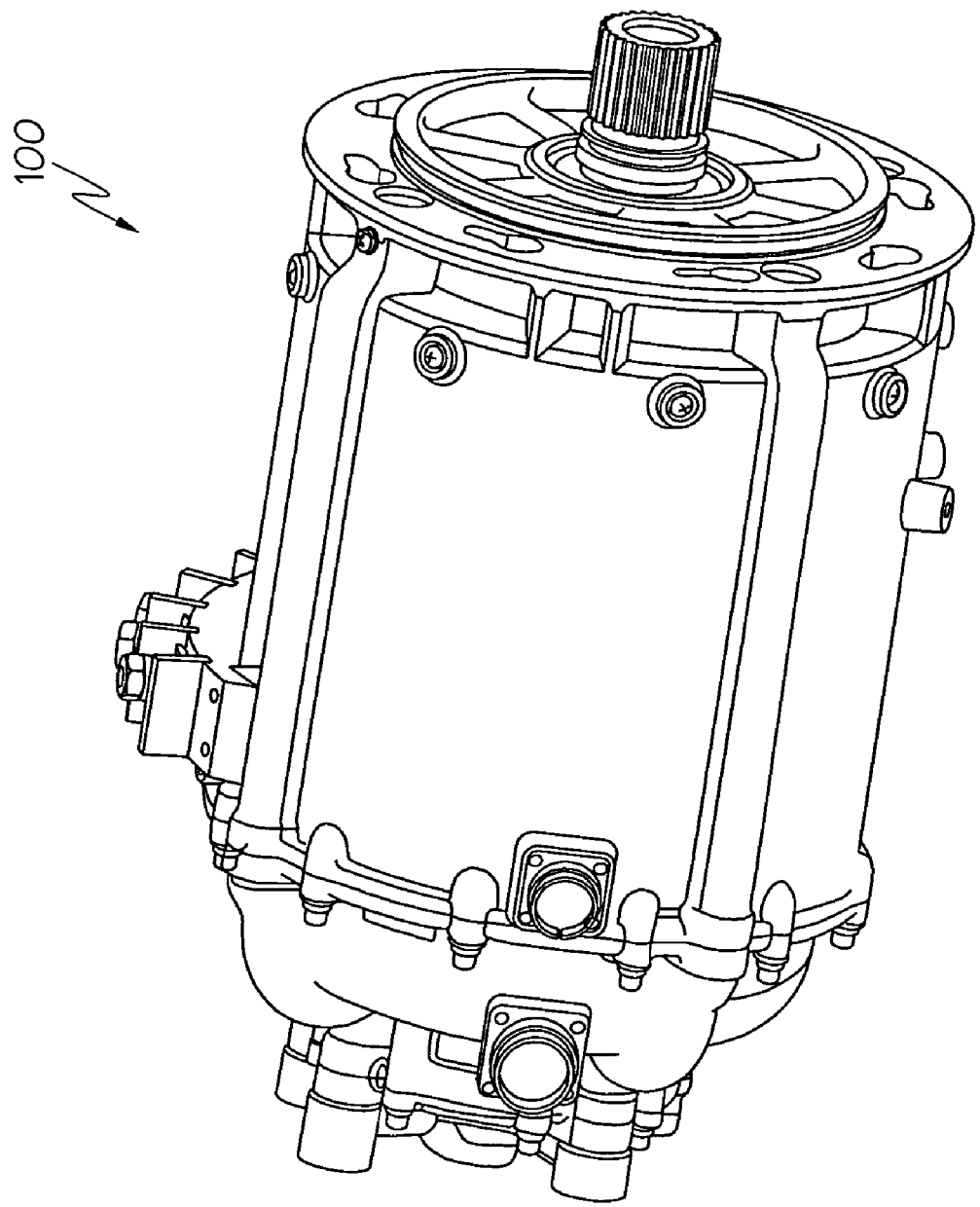
FIG. 2 is a perspective view of a physical embodiment of the generator system depicted in FIG. 1.

In the depicted embodiment, the PMG rotor 112, the exciter rotor 124, and the main generator rotor 132 all rotate along a single axis 198 at the same rotational speed. In this regard, each component is coupled to a rotatable shaft 300. It Will be appreciated, however, that in other embodiments the PMG rotor 112 may rotate along a different axis. In such case, the rotors 122, 124, and 124 may be coupled to separate shafts. Moreover, the relative positioning of the PMG 110, the exciter 120, and the main generator 130 can be modified in different embodiments such that the exciter 120 is physically between the PMG 110 and the main generator 130. A perspective view of a physical embodiment of at least those portions of the generator system 100 that are mounted within a generator housing 200 is provided in FIG. 2.

Figure 3:
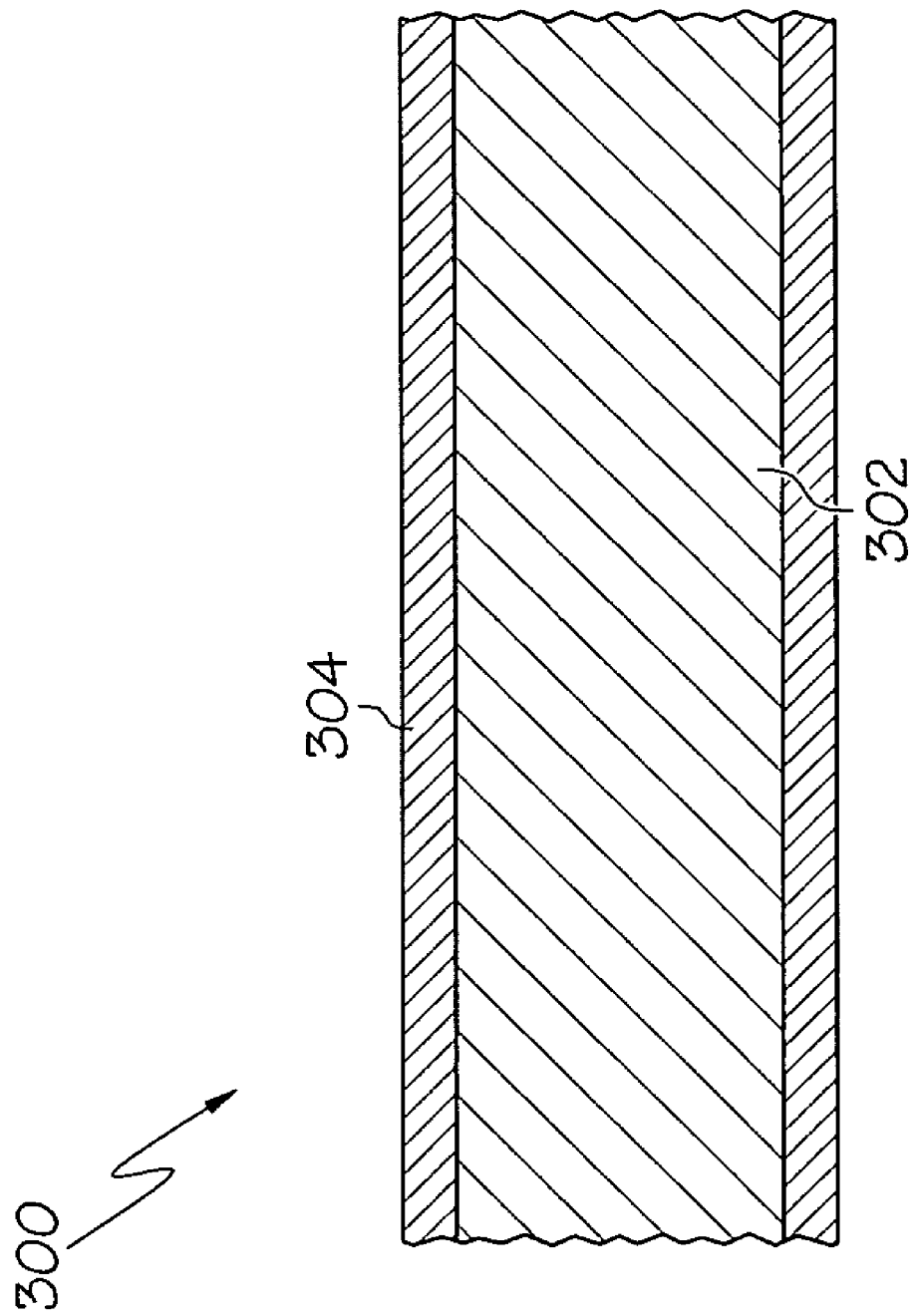
FIG. 3 is a cross section view of an exemplary shaft that may be employed in the generator depicted in FIG. 2.

Turning now to FIG. 3, a cross section view of an exemplary shaft 300 is illustrated. The rotor shaft 300 includes an inner shaft 302 and a sleeve 304. The inner shaft 302 is preferably a solid rod or a thick-walled tube that has a stiffness of at least 300 GPa or 44 Msi. The inner shaft 302 may comprise any material capable of being formed into a rod or tube having the preferred stiffness. For example, the inner shaft 302 may comprise any one of numerous metal matrix composites. Metal matrix composites typically have a metal base with a non-metallic reinforcing constituent, such as a ceramic material.

The metal base may be any one of numerous types of metals typically used in a metal matrix composite, including, but not limited to titanium, steel, magnesium, aluminum, or alloys thereof. The reinforcing constituent may comprise any one of a number of different types of ceramic materials, such as, for example, silicon carbide, boron, and graphite and may be distributed throughout the metal alloy in any configuration.

In one exemplary embodiment, the ceramic reinforcement material is configured as discontinuous fibers that are randomly distributed throughout the metal alloy. In another exemplary embodiment, the discontinuous fibers are substantially unaligned. In another exemplary embodiment, the discontinuous fibers are substantially aligned. In still another exemplary embodiment, the fibers are continuous and are woven into a net-like structure having a particular shape, such as, for example, the shape of the inner shaft 302. The woven structure is then impregnated with the matrix material using one of numerous conventional processes.

The sleeve 304 surrounds the inner shaft 302, and comprises a machinable material that has a stiffness that is less than the stiffness of the inner shaft 302. Additionally, the sleeve 304 is preferably not the same material as the material of the inner shaft 302. Suitable materials that may be used to construct the sleeve 304 include, but are not limited to, steel alloys, such as 4140, nickel alloys or other materials conventionally used to construct a shaft.

In a preferred method of manufacturing the rotor shaft 300, the inner shaft 302 and the sleeve 304 are each separately constructed so that characteristics of each component may be optimized during manufacture and heat treatment. The inner shaft 302 is preferably formed into a rod or a thick-walled tube and is manufactured using any conventional technique for forming metal matrix composite components. Suitable techniques includes, for example, high pressure diffusion bonding, casting, or powder-metallurgy.

After the inner shaft 302 is formed, the stiffness of the inner shaft 302 is optimized. In one example, the inner shaft 302 is heat treated to achieve a desired stiffness. In another example, the inner shaft 302 comprises aluminum metal and silicon carbide fibers and is heated to a temperature of between about 960° F. and 1075° F., quenched, then heated to about 340° F. for about 8 hours to attain a stiffness of about 200 GPa. In still another example, the inner shaft 302 is formed with a metal matrix composite having discontinuous fibers, and after the shaft 302 is formed, it is re-processed, such as, by rolling, to align the discontinuous fibers in the preferred direction.

The sleeve 304 is constructed in a conventional manner and the hardness and/or strength characteristics of the sleeve 304 are optimized for each stage of manufacture. In one exemplary embodiment, the sleeve 304 characteristics are optimized through heat treatment to allow easy machining of the complex external geometry required, then the sleeve 304 is heat treated to increase strength/hardness to reduce wear on faying surfaces. In many cases, the sleeve 304 is constructed of a material that requires higher temperatures to achieve its optimum mechanical properties than the inner shaft 302 can withstand without affecting its mechanical properties; thus, the separate manufacture of the inner shaft 302 and sleeve 304 allows optimization of the desired characteristics of each material. The sleeve 304 preferably has a sufficient thickness to allow for formation or machining of complex features therein. In a preferred embodiment, the sleeve 304 has a thickness that is less than the thickness of the inner shaft 302. For example, the sleeve 304 and inner shaft 302 may have a thickness ratio of 5:1.

The inner shaft 302 and the sleeve 304 are preferably interference fit against one another. In such case, the inner shaft 302 preferably has an outer peripheral diameter that is slightly greater than or equal to the inner peripheral diameter of the sleeve 304. The sleeve 304 is heated so that it will expand, and the inner shaft 302 is cooled so that it will shrink. The inner shaft 302 is then inserted into the sleeve 304. Thereafter, the inner shaft 302 and sleeve 304 are allowed to return to room temperature. As such, the inner shaft 302 expands to its normal diameter and the sleeve 302 shrinks to its normal diameter providing an interference fit. It will be appreciated that other suitable methods for manufacturing the shaft 300 may be employed as well. In one exemplary embodiment, the inner shaft 302 is obtained or manufactured and the sleeve 304 is deposited over the inner shaft 302 as a coating, via, for example, spraying, casting or powder-metallurgy techniques.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for manufacturing a rotor shaft for use in a generator, the method comprising:

forming a rod from a metal matrix composite material, the rod having an outer diameter;

heating the rod to attain a stiffness thereof that is greater than about 300 GPa;

forming a machinable sleeve from material having a stiffness that is less than the stiffness of the rod and that is different than the material of the rod, the sleeve having an inner diameter that is equal to or less than the rod outer diameter; and inserting the rod into the sleeve, after the rod is heated.

2. The method of claim 1, further comprising:

heating the sleeve and cooling the rod, before the step of inserting.

3. The method of claim 1, wherein the metal matrix composite material comprises ceramic fibers.

4. The method of claim 1, wherein the metal matrix composite material comprises discontinuous fibers.

5. The method of claim 1, wherein the metal matrix composite material comprises substantially unaligned fibers.

6. The method of claim 1, wherein the step of forming the rod comprises forming the rod from a plurality of ceramic fibers woven into a net and impregnating the net with metal.

7. The method of claim 1, wherein the step of forming a sleeve comprises forming a sleeve from a steel alloy.

8. The method of claim 1, further comprising the step of machining features into an outer surface of the sleeve.

9. A method for manufacturing a rotor for use in a generator, the method comprising:

forming a rod from a metal matrix composite material comprising a steel alloy having discontinuous random silicon carbide fibers dispersed therethrough, the rod having an outer diameter;

heating the rod to attain a stiffness thereof that is greater than about 200 GPa;

forming a machinable sleeve from material having a stiffness that is less than the stiffness of the rod and that is different than the material of the rod, the sleeve having an inner diameter that is equal to or less than the rod outer diameter;

heating the sleeve;

cooling the rod; and inserting the rod into the sleeve, after the sleeve is heated to attain the stiffness.

\* \* \* \* \*

UNITED STATES PATENT AND TRADEMARK OFFICE
CERTIFICATE OF CORRECTION

PATENT NO. : 7,617,582 B2 Page 1 of 1
APPLICATION NO. : 11/175807
DATED : November 17, 2009
INVENTOR(S) : Down et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Nineteenth Day of October, 2010

David J. Kappos
*Director of the United States Patent and Trademark Office*